United States Patent
Bleidt et al.

(10) Patent No.: US 6,450,504 B2
(45) Date of Patent: Sep. 17, 2002

(54) CYLINDER HEAD GASKET

(75) Inventors: Michael Bleidt, Dettingen; Armin Diez, Lenningen; Frank Schmucker, Ehingen, all of (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 09/783,438

(22) Filed: Feb. 14, 2001

Related U.S. Application Data

(63) Continuation of application No. 09/309,449, filed on May 11, 1999, now abandoned.

(51) Int. Cl.[7] ................................................ F02F 11/00
(52) U.S. Cl. .................... 277/592; 277/593; 277/594; 277/595
(58) Field of Search ................................ 277/592, 593, 277/594, 595, 596

(56) References Cited

U.S. PATENT DOCUMENTS 5,695,200 A * 12/1997 Diez et al. .................. 277/180
6,135,459 A * 10/2000 Hiramatsu et al. .......... 277/593

* cited by examiner

Primary Examiner—Heather Shackelford
Assistant Examiner—Fredrick Conley
(74) Attorney, Agent, or Firm—Alix, Yale & Ristas, LLP

(57) ABSTRACT

The invention relates to a metallic cylinder head gasket for an internal combustion engine, having a cover plate which faces the cylinder head of the internal combustion engine in the installed state and is provided with one or more openings arranged next to one another, corresponding to the combustion chambers of the internal combustion engine. The cover plate has a bead around each opening with a space between the bead and the opening. This leaves a straight sheet metal portion in the edge region of the opening. Arranged adjacent to the bead around each opening radially inwards from the respective bead facing away from the cylinder head is a stopper for the bead, which at the same time forms an upward combustion chamber extension of the seal. In this case, the stopper decreases in its thickness radially outwards in such a way that the surface pressure in the region of the stopper is essentially homogeneous over the width of the stopper under operating conditions.

32 Claims, 5 Drawing Sheets

CYLINDER HEAD GASKET

RELATED APPLICATIONS

This application is a continuation of U.S. patent application Ser. No. 09/309,449, filed on May 11, 1999 now abandoned.

FIELD OF THE INVENTION

The invention relates to cylinder head gaskets as they are used in internal combustion engines.

DESCRIPTION OF THE RELATED ART

European Patent Application published as EP 0 627 581 A1 discloses a cylinder head gasket in which two beaded cover plates are provided with a carrier plate located in between. Welded to the carrier plate is a spring travel limiter for protecting the beads, also referred to as a stopper, which extends along the edge of the combustion chamber of the internal combustion engine and also serves for upward extension of the combustion chamber. The cylinder head of the internal combustion engine is thereby being given a defined prestress during clamping-in of the cylinder head gasket along the edge of the combustion chamber. To make the welding easier, the separately produced stopper is initially designed such that it is trapezoidal in section and is then pressed flat to a desired height adjacent to the edge of the combustion chamber, so that it is given mutually parallel bearing in which surfaces for the planar portions of the cover plates radially inwards from the beads. Accordingly, with the initial trapezoidal shape there is no influence on the function of the cylinder head gasket.

In the case of internal combustion engines with less rigid cylinder heads, for instance made of an aluminum alloy, it has been found that a "rolling movement" of the cylinder head takes place over the width of the stopper. This has the consequence that high edge pressure causes bending and shearing stresses in the cover plates and in the carrier plate of the cylinder head gasket, which may ultimately lead to cracks in the cover plates and in the carrier plate.

German Patent Application published as DE 196 01 324 A1 likewise discloses a metallic cylinder head gasket in which there is provided between two beaded cover plates and a flanged plate with a thickened end portion extending around a combustion chamber opening and formed by folding back a portion of this plate onto the plate. The thus formed flanged portion of the flanged plate is in front of the edges of the cover plates in the radial direction of the combustion chamber opening, so that the flanged portion is not subjected to any pressure. The part of the portion that is effective with respect to the beads has a constant thickness.

German Patent published as DE 195 31 232 C2 discloses a metallic cylinder head gasket in which the flanged portion of the flanged plate forming a stopper of constant thickness for the beads of the cover plates is not provided in the land region between the combustion chamber openings if the land region is very narrow.

SUMMARY OF THE INVENTION

It is therefore an object of the invention to provide a cylinder head gasket having a service life which is adversely affected as little as possible by a rolling movement of the cylinder head over the width of the stopper.

The present invention provides a metallic cylinder head gasket for an internal combustion engine having a cylinder head and a cylinder block provided with combustion chambers. The gasket comprises a cover plate which faces the cylinder head when installed and which is provided with one or more openings arranged side-by-side corresponding to the combustion chambers of the internal combustion engine. The cover plate has a bead extending around each opening with a space between the bead and the combustion chamber. This leaves a straight sheet metal portion in the edge region of the opening. A stopper for protecting the bead is arranged adjacent to the bead around each opening radially inwards from the respective bead. The apex of the bead faces away from the cylinder head. The stopper forms a seal portion of increased height wherein the stopper decreases in its thickness radially outwards by a decrease in material thickness in such a manner that the surface pressure in the region of the stopper is essentially homogeneous over the width of the stopper under operating conditions.

The edge pressure is reduced by corresponding beveling of the stopper. This has the consequence that the bending and shearing stresses in at least one cover plate and in a carrier plate, if provided, can be reduced. Consequently, the risk of cracks in the cover plates and in the carrier plate can be reduced. Instead of localized forces on a small area, forces are distributed over a larger surface area is obtained. Consequently, there is a lower partial pressure between the cylinder head and the facing cover plate and, as a result of this, less wear. The stopper is consequently adapted to the deformation of the cylinder head. Adaptation to different cylinder head rigidities is possible by correspondingly changing the angle of the beveling. The angle of the beveling is determined by means of clamping-in tests.

The invention is explained in more detail below with reference to exemplary embodiments represented in the attached drawings.

DESCRIPTION OF THE PREFERRED EMBODIMENTS

Figure 1:
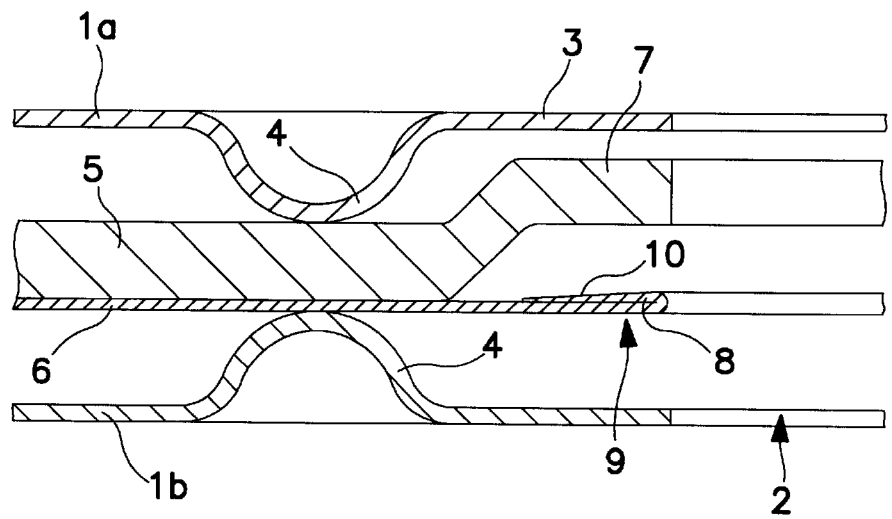
FIG. 1 is a cross-section view of a cylinder head gasket according to a preferred embodiment of the invention that comprises first and second cover plates, a carrier plate having a cranked or offset portion and a flanged plate.

The cylinder head gasket illustrated in FIG. 1, comprises two cover plates 1a, 1b, of which the cover plate 1a faces the cylinder head (not shown) of the internal combustion engine for which the cylinder head gasket is designed when the cylinder head gasket is in the installed state, while the cover plate 1b faces the cylinder block (not shown). The cover plates 1a, 1b are provided with one or more openings 2, usually a plurality thereof, arranged next to one another, corresponding to the combustion chambers of the internal combustion engine. The cover plates 1a, 1b are, moreover, provided around each opening 2 with an annular bead 4, running around the respective opening 2 with a spacing with respect to the latter, leaving a straight or flat sheet metal portion 3 in the edge region of the opening, the beads 4 of the two cover plates 1a, 1b facing each other with their apexes. As used herein, the term "apex" refers to the crest of the arcuate contour.

Between the two cover plates 1a, 1b there is an intermediate layer, which in the case of the exemplary embodiment represented in FIG. 1, is formed by a carrier plate 5 and a flanged plate 6. The carrier plate 5 is provided in the edge region of the opening with a cranked or offset portion 7, in the region of which a folded flange 8, produced by providing a flange on the plate 6 is disposed. The folded flange 8 together with (1) the offset portion 7 located above the flange 8 and (2) the part of the plate 6 below the flange 8 form a stopper 9 having a greater overall plate thickness than the rest of the cylinder head gasket. This dimensional characteristic serves to limit the spring travel of the associated bead(s) 4 and also to form a thickened sealing portion around the edge of the combustion chamber, so that the highest pressing pressure prevails along the edge region of the opening when the cylinder head gasket is clamped between the block and the cylinder head.

The folded flange 8 is, in this embodiment, provided with a bevel 10 decreasing in its thickness radially outwards, so that the surface pressure in the region of the stopper 9 is essentially homogeneous over the width of the stopper in the radial direction under operating conditions, i.e. when the internal combustion engine is running and is correspondingly heated up. In this respect, critical operating conditions are expediently assumed, for example, full load. In the cold, installed state, the radially outer portion of the bevel 10 may not yet be under pressure.

Figure 2:
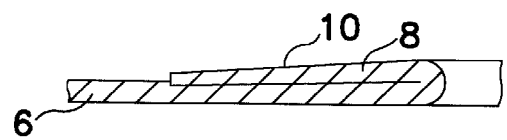
FIGS. 2 to 5 are cross section views of portions of preferred embodiments of the gasket of the invention.
Figure 3:
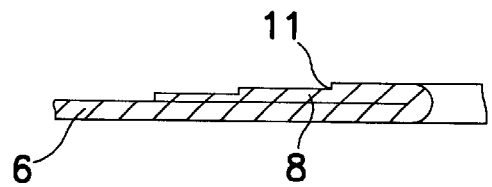
Figure 16:
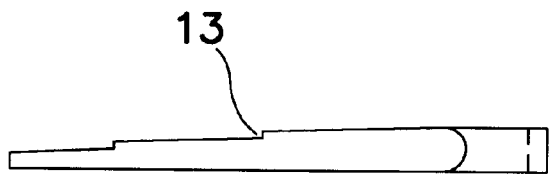
FIG. 16 is a view similar to FIG. 3 in which the steps are beveled.

A high-grade or stainless steel plate of a thickness of approximately 0.12 to 0.15 mm is preferable for the flanged plate 6. It is possible for a bevel 10 of approximately 3/100 mm to be provided, for example, over a folded flange width of 2.5 mm. The bevel 10 may also be formed by steps 11 as shown in FIG. 3. At the same time, a beveling of the steps may be provided as illustrated in FIG. 16 by the steps 13. The difference in height in the form of the bevel 10 and/or steps is expediently produced by punching. In this case, the folded flange 8 usually presses slightly into the flanged plate 6, as illustrated in FIG. 2. The carrier plate 5 is usually a plate of cold-rolled steel, while the cover plates 1a, 1b is usually a spring steel.

Figure 4:
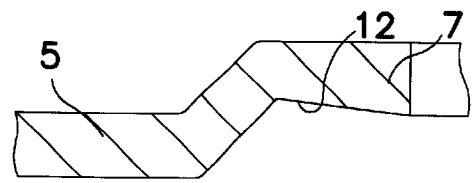
Figure 5:
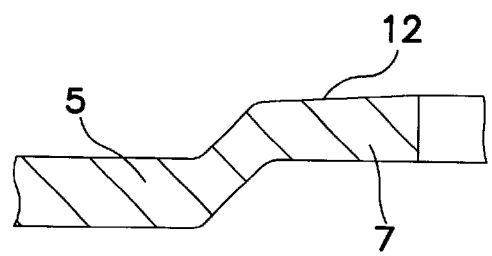
Figure 6:
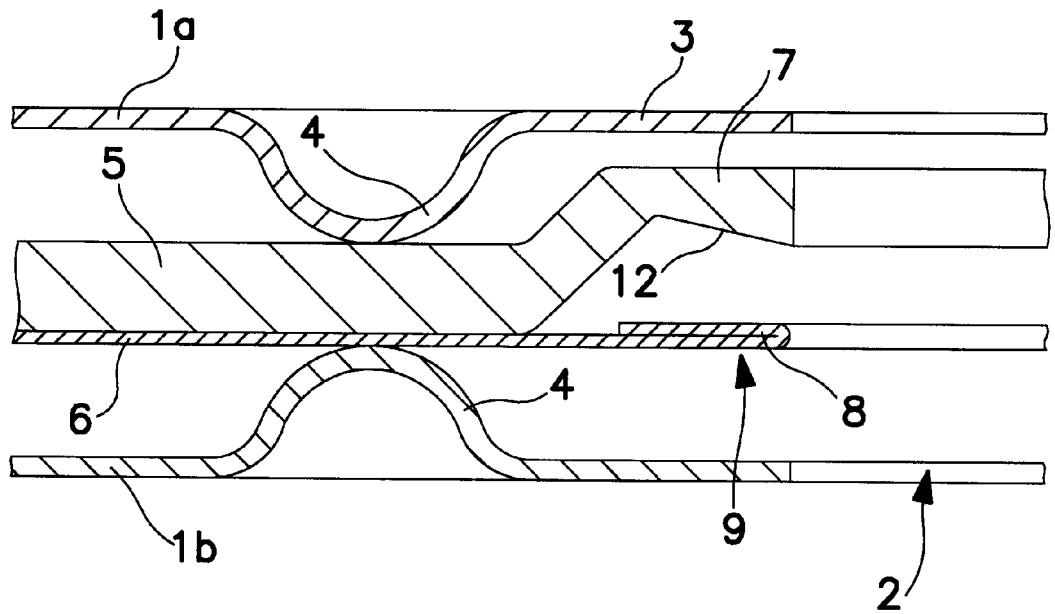
FIG. 6 is a cross-section view of another preferred embodiment of the invention similar to the embodiment illustrating FIG. 1, in which the cranked portion of the carrier plate is beveled.

The flanged plate 6 may, however, also be formed on the side facing the folded flange 8 such that it correspondingly decreases in height radially outwards. Furthermore, the carrier plate 5 may have a corresponding bevel 12 in the region of the cranked portion 7 on the side facing the cover plate 1a or the flanged plate 6, while the folded-around region of the flanged plate 6 is virtually constant in its thickness. The beveled portion 12 of the cranked portion 7 of the carrier plate 5 is shown in FIGS. 4, 5 and 6.

Figure 7:
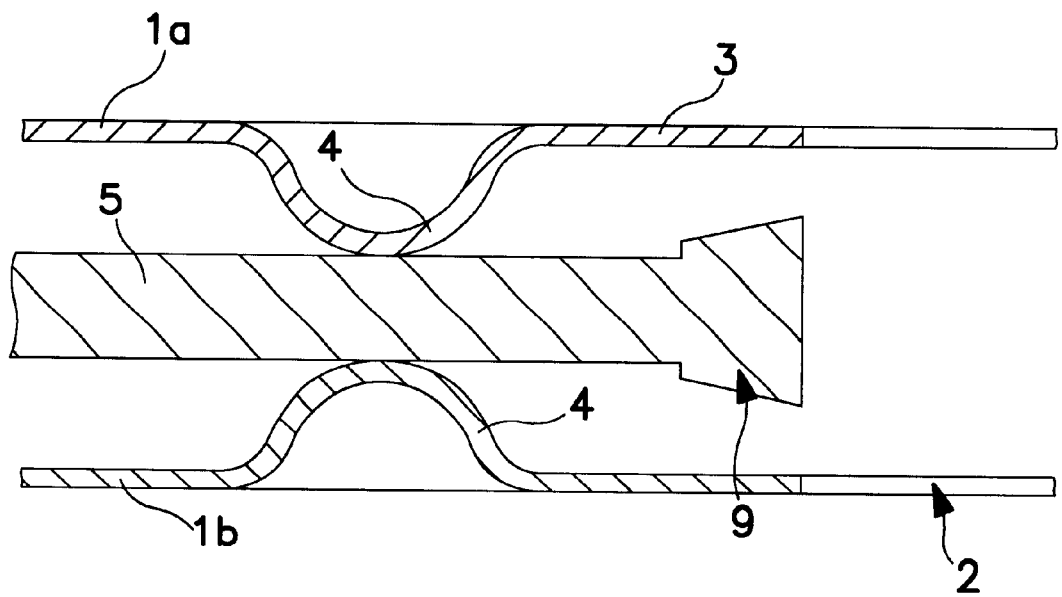
FIG. 7 is a cross-section view of another preferred embodiment of the invention in which the stopper is formed integrally with the carrier plate and the stopper decreases in thickness radially outward from a cylinder opening.
Figure 8:
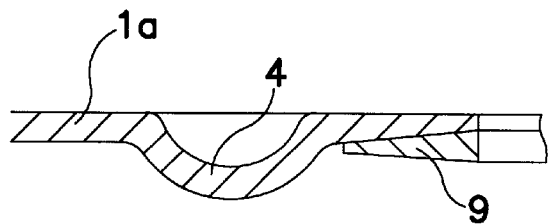
FIG. 8 is a cross-section view of another preferred embodiment of the invention in which a cover plate has a stopper formed by a discrete beveled element.
Figure 9:
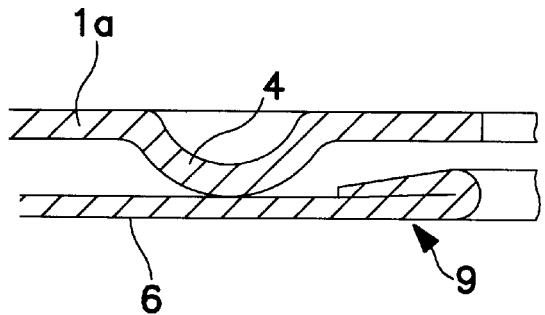
FIG. 9 is a cross-section view of another preferred embodiment of the invention in which a cover plate cooperates with a plate having a stopper defined by a folding flange.
Figure 10:
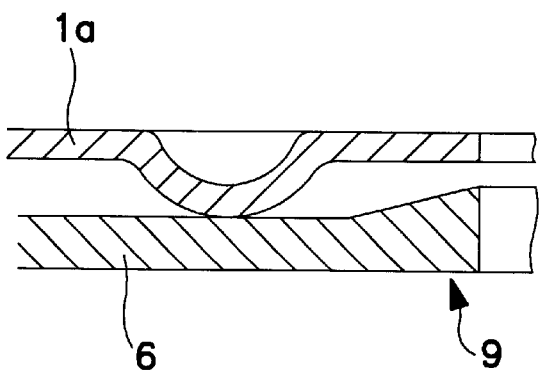
FIG. 10 is a cross-section view of another preferred embodiment of the invention in which a cover plate cooperates with a carrier plate having an integrally formed stopper that decreases in thickness radially outward from a cylinder opening.
Figure 11:
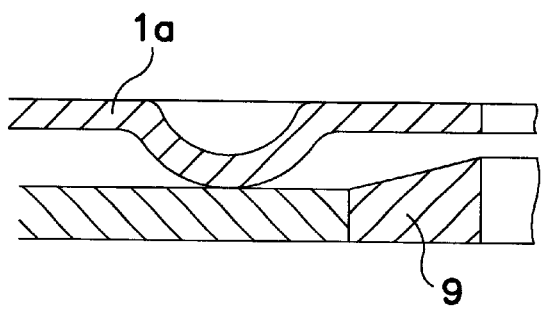
FIG. 11 is a cross-section view of another preferred embodiment of the invention in which a cover plate cooperates with a carrier plate to which is welded a stopper that also decreases in thickness radially outward from a cylinder opening.
Figure 12:
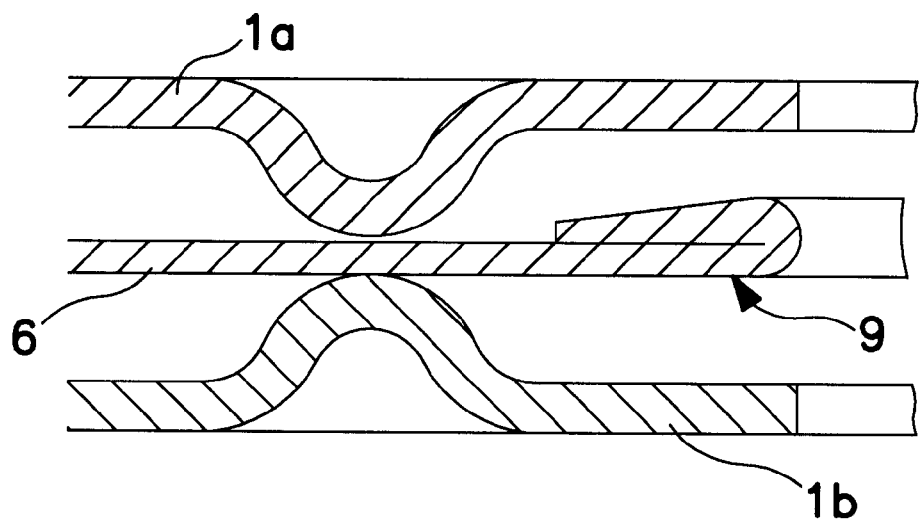
FIG. 12 is a cross-section view of another preferred embodiment of the invention in which two cover plates cooperate with a flanged plate having a stopper defined by a folded flange.
Figure 13:
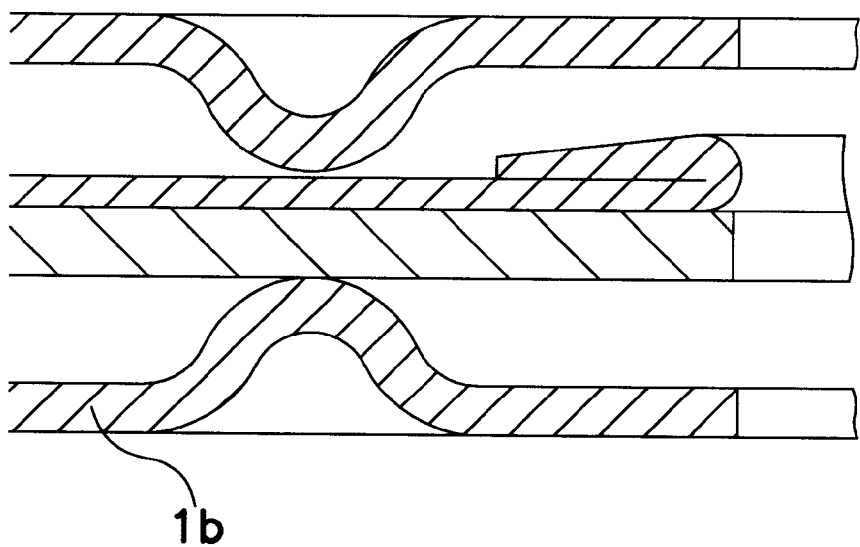
FIG. 13 is a cross-section view of another preferred embodiment of the invention in which two cover plates cooperate with a flanged plate having a stopper defined by a folded flange and which further includes a carrier plate.
Figure 14:
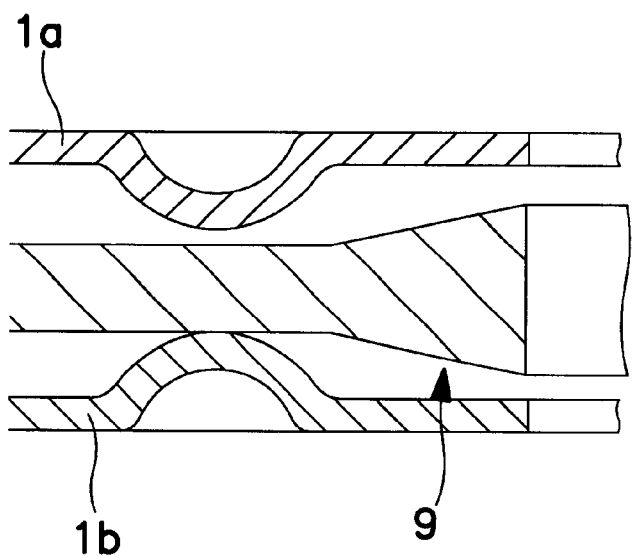
FIG. 14 is a cross-section view of another preferred embodiment invention in which two cover plates cooperate with a carrier plate having an integrally formed stopper that also decreases in thickness radially outward from a cylinder opening.
Figure 15:
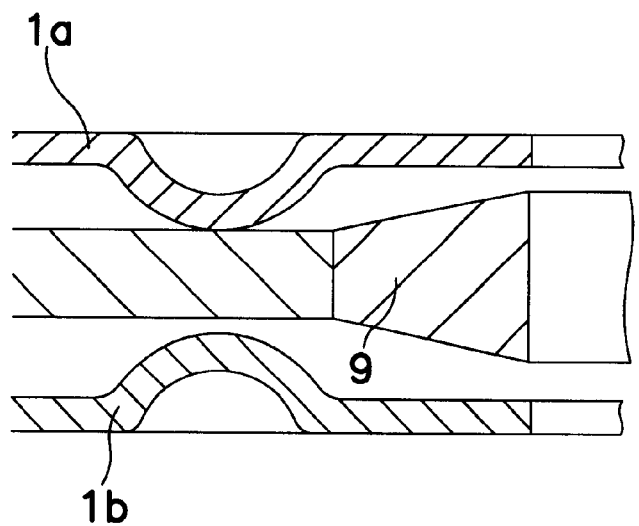
FIG. 15 is a cross-section view of still another preferred embodiment of the invention in which two cover plates cooperate with a carrier plate having a stopper welded on the extremity thereof that also decreases in thickness radially outward from a cylinder opening.

The entire stopper 9 may also be formed integrally on the carrier plate 5 by corresponding deformation such that it decreases in its thickness radially outwards, or as a ring which is inserted into a corresponding opening concentric to the opening 2 and decreases in its thickness radially outwards. In that case there is no need for a flanged plate 6. This is shown in FIG. 7. It may also be that there is no need for the cover plate 1b that is facing the cylinder block. The cylinder head gasket can also be of one layer, for example, the gasket may comprise only the beaded cover plate 1a. That plate may bear on the side on which the apex of the bead 4 is located. A stopper 9 may, for example, be welded on and be correspondingly beveled. The stopper 9 on the flanged plate 6 is expediently rounded in the bending region at the opening 2 in order to avoid edge pressures there.

As used herein, the term "plate" means any plate referred to herein including a cover plate, a flanged plate, or a carrier plate. Also, as used herein, the term "stopper" refers only to structure that functions as a spring travel limiter for protecting the beads 1a and 1b. Also as used herein the term "stopper" does not refer to any structure that supports the stopper.

What is claimed is:

1. A metallic cylinder head gasket for an internal combustion engine having a cylinder head and a cylinder block provided with combination chambers, said gasket comprising:

a cover plate for facing the cylinder head when installed and being provided with one or more openings arranged side-by-side corresponding to the combustion chambers of the internal combustion engine, said cover plate having a bead extending around and spaced outwardly from each opening thereby leaving a straight sheet metal portion in the edge region between said bead and said opening, said bead having an apex, said apex facing away from the cylinder head;

a carrier plate disposed in generally parallel relationship to said cover plate, said carrier plate abutting each of said beads;

a stopper carried on said carrier plate for protecting said bead, said stopper being arranged adjacent to the said bead around each opening radially inward from the respective bead, said stopper forming a seal portion having a thickness that decreases radially outwards from said opening along the radial extent of said stopper.

2. The cylinder head gasket according to claim 1, wherein the thickness that decreases radially outward in the stopper is formed by a bevel.

3. The cylinder head gasket according to claim 1, wherein the stopper has a thickness that decreases in discrete steps.

4. The cylinder head gasket according to claim 1 and further including a flanged plate and wherein said stopper includes a part of said flanged plate comprising a folded flange portion folded back over said flanged plate and said folded flange portion has a thickness that decreases in the radial direction away from said opening.

5. The cylinder head gasket according to claim 4, wherein a carrier plate is provided and wherein said stopper further includes a cranked portion of said carrier plate in the region of and adjacent to said folded flange portion.

6. A cylinder head gasket according to claim 5, wherein said cranked portion has a thickness that decreases in the radial direction away from said opening.

7. The cylinder head gasket of claim 1 and further including a carrier plate and wherein said stopper comprises a portion of said carrier plate.

8. The cylinder head gasket according to claim 1, wherein the structure proximate to said opening is rounded in the region of the opening.

9. The cylinder head gasket of claim 8, wherein said stopper comprises a portion of said carrier plate.

10. A metallic cylinder head gasket for an internal combustion engine having a cylinder head and a cylinder block provided with combustion chambers, said gasket comprising:
a first cover plate for facing the cylinder head when installed and a second cover plate for facing the cylinder block when installed, each of said cover plates being provided with one or more openings arranged side-by-side corresponding to the combustion chambers of the internal combustion engine and each of said cover plates having a bead extending around and spaced outwardly from each opening thereby leaving a planar portion in the edge region between said bead and said opening, said bead of said first cover plate having a first apex, said first apex facing away from the cylinder head and said bead of said second cover plate having a second apex, said second apex facing away from the cylinder block;
a carrier plate located between said first and second cover plates and between said beads of said first and second cover plates and extending toward said opening from said beads;
a stopper for protecting said bead, said stopper being carried by said carrier plate and arranged adjacent to the said bead around each opening radially inward from the respective bead, said stopper forming a seal portion that decreases in its thickness radially outwards from said opening along the radial extent of said stopper.

11. The cylinder head gasket according to claim 10, wherein the decrease in thickness of the stopper is formed by a bevel.

12. The cylinder heat gasket according to claim 10, wherein the stopper is provided with a stepwise decrease in thickness.

13. The cylinder heat gasket according to claim 10 and further including a flanged plate and wherein said stopper includes a part of said flanged plate comprising a folded flange portion folded back over said flanged plate and said folded flange portion decreases in thickness in the radial direction away from said opening.

14. The cylinder head gasket according to claim 11, wherein said carrier plate includes a cranked portion in the region of and adjacent to said folded flange portion.

15. A cylinder head gasket according to claim 14, wherein said cranked portion decreases in thickness in the radial direction away from said opening.

16. A metallic cylinder head gasket for an associated internal combustion engine having an associated cylinder head and an associated cylinder block provided with combustion chambers, said gasket comprising:
a plate having a generally planar side thereof disposed in facing relationship in the associated cylinder head when installed, said plate having one or more openings arranged in side-by-side relationship corresponding to the combustion chambers of the internal combustion engine;
a bead extending around each such opening, each of said beads having an apex, each said apex facing away from the associated cylinder head;
a stopper for protecting each of said beads, each stopper being disposed intermediate one of said openings and the bead extending around that opening, each of said stoppers forming a seal portion that decreases in its thickness radially outwards from each opening and each of said stoppers functioning as a spring travel limiter for protecting the bead which surrounds the stopper.

17. The cylinder head gasket in accordance with claim 16 further including means for supporting each of said stoppers intermediate one of said openings and one of said beads.

18. The cylinder head gasket accordance with claim 17, wherein each of said stoppers extends around the entire circumferential extent of each opening.

19. The cylinder head gasket in accordance with claim 18, wherein the decrease in thickness of each stopper is formed by a bevel.

20. The cylinder heat gasket in accordance with claim 18, wherein each stopper is provided with a stepwise decrease in thickness.

21. The cylinder head gasket in accordance with claim 18 further including a flanged plate and wherein said stopper includes a part of said flanged plate comprising a folded flange portion folded back over said flanged plate and said folded flange portion decreases in thickness in the radial direction away from said opening.

22. The cylinder head gasket in accordance with claim 21 further including a carrier plate and wherein said stopper further includes a cranked portion of said carrier plate in the region of and adjacent to said folded flange portion.

23. A cylinder head gasket according to claim 22, wherein said cranked portion decreases in thickness in the radial direction away from said opening.

24. The cylinder head gasket in accordance with claim 23, wherein said stopper comprises a portion of said carrier plate.

25. A cylinder head gasket in accordance with claim 16 further including a carrier plate and wherein said stopper comprises a portion of said carrier plate.

26. The cylinder head gasket in accordance with claim 16, wherein the stopper is rounded in the region of the opening.

27. A metallic cylinder head gasket for an internal combustion engine having a cylinder head and a cylinder block provided with combustion chambers, said gasket comprising:
a first cover plate for facing the cylinder head when installed and a second cover plate for facing the cylinder block when installed, each of said cover plates being provided with one or more openings arranged in side-by-side relationship corresponding to the combustion chambers of the internal combustion engine and each of said cover plates having a bead extending around and spaced outwardly from each opening thereby leaving a straight sheet metal portion in the edge region between said bead and said opening, said bead of said first cover plate having a first apex, said first apex facing away from the cylinder head and said bead of said second cover plate including a second apex, said second apex facing away from the cylinder block;

a carrier plate located between said first and second cover plates and between said beads of said first and second cover plates and extending toward said opening from said beads;

a stopper for protecting said bead, said stopper being associated with said carrier plate and arranged adjacent to the said bead around each opening radially inward from the respective bead, said stopper forming a seal portion of increased height, said stopper decreasing in its thickness radially outwards.

28. The cylinder head gasket according to claim 26, wherein the decrease in thickness of the stopper is formed by a bevel.

29. The cylinder head gasket according to claim 28, wherein the stopper is provided with a stepwise decrease in thickness.

30. The cylinder head gasket according to claim 29, wherein said carrier plate includes a cranked portion in the region of and adjacent to said folded flange portion.

31. The cylinder head gasket in accordance with claim 28 further including a flanged plate and wherein said stopper includes a part of said flanged plate comprising a folded flange portion folded back over said flanged plate and said folded flange portion decreases in thickness in the radial direction away from said opening.

32. A cylinder head gasket in accordance with claim 31, wherein said cranked portion decreases in thickness in the radial direction away from said opening.

* * * * *